United States Patent Office 3,259,729
Patented July 5, 1966

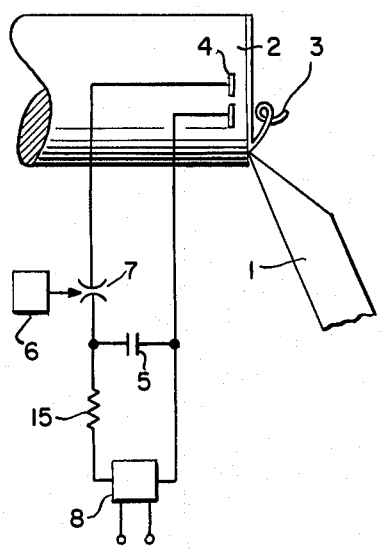
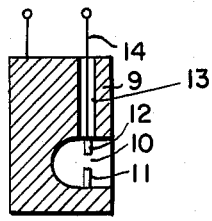
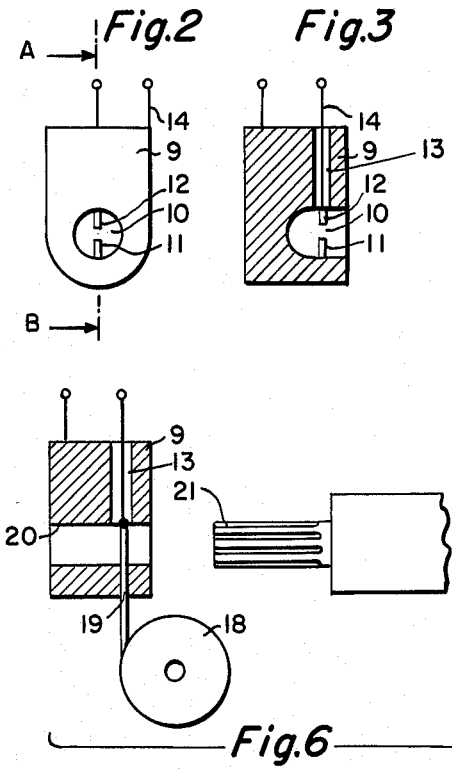
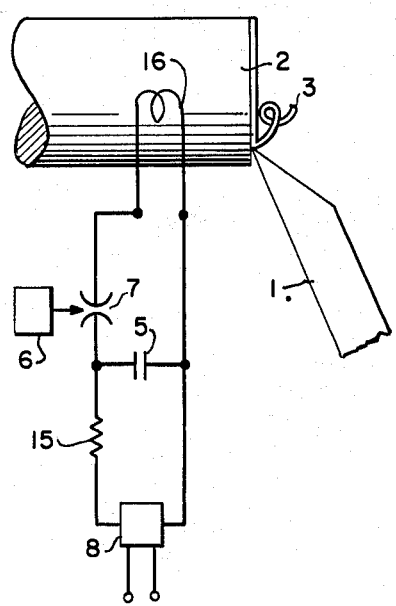
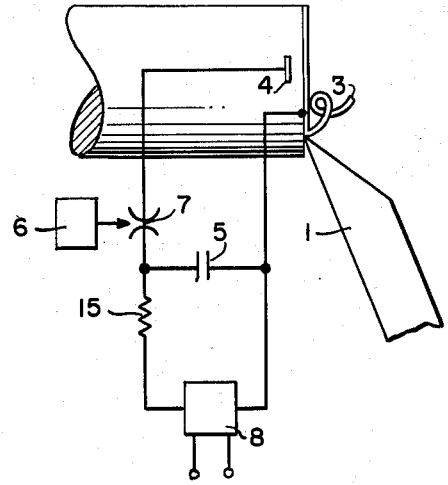

3,259,729
METHOD AND APPARATUS FOR PERIODICALLY SEPARATING CHIPS FORMED DURING A MACHINING OPERATION
Hans-Josef Mürtz, Lampertheim, and Ewald Jensko, Weinheim an der Bergstrasse, Germany, assignors to Brown, Boveri & Cie, Aktiengesellschaft, Mannheim-Kafertal, Germany, a German corporation
Filed Nov. 20, 1964, Ser. No. 412,652
Claims priority, application Germany, Nov. 23, 1963, B 74,377
13 Claims. (Cl. 219—68)

Our invention relates to method and apparatus for periodically separating or stripping off chips formed during a machining operation.

The separation of chips from a workpiece during a metal machining operation often causes great difficulty. The difficulties which arise are alleviated only to a limited extent by measures which have now first become known, such as by the employment of chip deflectors, scrap comminuters or vibrators. Since jamming of the tool and the workpiece due to accumulated chips cannot be completely eliminated, all of these known devices fail to operate with sufficient assurance; consequently, it has been completely impossible to fully automatize machine operations of this type. Since the entire manufacturing process for the most part must be interrupted due to a breakdown of these operating machines, extremely expensive materials of specific alloys, which permit chip separation or detachment without difficulty, must be employed, or each machine must be under constant supervision to remove any obstruction before damage is done to the machine.

It is an object of our invention to provide a method and apparatus for periodically separating or detaching from workpieces chips formed during a machining process which avoids the necessity for constantly supervising the machine to remove obstructions, and also permits the employment of less costly working materials.

With this object in view and in accordance with our invention, we provide a method for periodically separating chips formed during a machining process utilizing the dynamic effects produced by extremely strong current pulses of short duration in such a manner that the removal of the chips is effected directly or indirectly either by a pressure wave produced by a spark jumping across a pair of electrodes or by wire explosion or through the repulsive effect produced by means of a coil conducting a current pulse.

Also in accordance with our invention we provide apparatus for periodically detaching chips from a workpiece during a machining operation, comprising pulse generating means for generating a periodic high current pulse, and means electrically connected to said pulse generating means and energizable thereby for producing a compression wave applying a shearing force to a chip at its place of attachment to a workpiece so as to detach the chip from the workpiece.

Other features which are considered as characteristic for the invention are set forth in the appended claims.

Although the invention has been illustrated and described as a method and apparatus for periodically removing chips formed during a machining operation, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof, will be best understood from the following description of the method and of specific embodiments of the apparatus for carrying out the method when read in connection with the accompanying drawings, in which:

FIG. 1 is a diagrammatic view of one embodiment of our invention as applied to a workpiece machined by a facing tool;

FIG. 2 is a front elevational view of a modification of the embodiment of FIG. 1;

FIG. 3 is a sectional view of FIG. 2 taken along the line A–B in the direction of the arrows;

FIGS. 4 and 5 are other embodiments of the invention shown in FIG. 1; and

FIG. 6 is another modified form of the invention shown partly in section.

Although several embodiments and modifications are shown in the drawing and are hereinafter described, it is understood, however, that various other devices can be employed for carrying out the method of this invention.

Referring now to the drawings, wherein similar elements are identified by the same reference numerals, and particularly to FIG. 1 thereof, there is shown a turning or facing tool 1 performing an operation on a workpiece 2 which is rotatable on a lathe (not shown) so as to produce a chip 3. A spark-gap between two electrodes 4 is located adjacent the line or plane of severance between the workpiece 2 and the chip 3. The spark-gap electrodes 4 are connected with a bank of capacitances 5 across a device 6 for periodically introducing a spark discharge by means of a spark gap 7. The capacitance bank 5 is recharged across a load device 8 through a resistor 15 after each spark discharge. The pressure wave emanating from the spark gap 4 during the spark discharge detaches the chip 3.

The spark gap can be located within a reflector as shown in FIGS. 2 and 3 so as to better guide the pressure wave to the chip. The spark-gap electrodes 11, 12 are located within a recess 10 formed in a metallic support member 9. The electrode 11 is mechanically and electrically connected to the support member 9 and the electrode 12 shown lying above the same in FIGS. 2 and 3 is, however, secured in the support member 9, electrically insulated therefrom. A conductive lead 14 extends through a bore 13 formed in the support member 9 and is connected to the electrode 12. This lead 14 is insulated from the support member 9.

In order to detach the chip being formed from the workpiece 2 by means of a spark discharge, the spark gap can also be formed with only one electrode 4 while the chip 3 that is produced forms the opposite electrode, as shown in FIG. 5.

Instead of the spark gap a fuse wire 19, as shown in FIG. 6, can also be advantageously connected between current leads and can have such a rating that it vaporizes explosively when traversed by a strong current pulse, so that the pressure wave resulting therefrom then exerts a force on the chip which detaches it from the workpiece. In order for a device of this type to operate automatically and continually, the vaporized piece of fuse wire is continually replaced with the aid of a mechanism (not shown) such as a spring device or the like which slides a new piece of fuse wire, for example a coil, out of a magazine 18 to the location of the vaporized piece of fuse wire 19. Since the outlet opening of the fuse wire can be blocked due to the residue of the previously vaporized piece of fuse wire, it is expedient to bore out the outlet opening of the wire after each current pulse with the aid of an automatically operating space borer or reamer.

A further embodiment of the apparatus for carrying out the method of our invention is shown in FIG. 4. Instead of the spark gap 4 of the embodiment of FIG. 1, a coil 16 is located in the vicinity of the chip that is being formed in the embodiment of FIG. 4. The discharge current pulse passing through the coil 16 produces a magnetic field which induces currents in the chip 3 having an opposing effect on the magnetic field. A repulsive force is thereby exerted on the chip which breaks the chip from the workpiece.

As aforementioned, the invention of this application is not limited to the embodiments described and shown in the drawings. Thus, for example, in the embodiment of FIG. 1 the spark gap 7 and the device 6 for periodically introducing the spark discharge and, in the embodiment of FIG. 2, the device 6 alone, can be omitted and the duration of the sparking period can be varied, for example by varying the resistance 15. The invention can thus be advantageously employed above all where chips formed during the machining of metal must be detached in a very short time from the workpiece so that there is no danger of any obstruction to the machining apparatus.

We claim:

1. Apparatus for periodically detaching chips from a workpiece during a machining operation, comprising pulse generating means for generating a periodic high current pulse, and means electrically connected to said pulse generating means and energizable thereby for producing a compression wave applying a shearing force to a chip at its place of attachment to a workpiece so as to detach the chip from the workpiece.

2. Apparatus for periodically detaching chips from a workpiece during a machining operation, comprising pulse generating means for generating a periodic high current pulse and a spark gap located adjacent the place of attachment of a chip to a workpiece, said spark gap having electrodes electrically connected to said pulse generating means and adapted to receive an electric pulse for producing a spark across said gap so that a compression wave is formed applying a shearing force to the chip at its place of attachment to the workpiece whereby the chip is detached from the workpiece.

3. Apparatus for periodically detaching chips from a workpiece during a machining operation, comprising pulse generating means for generating a periodic high current pulse and a spark gap having a first electrode spaced from the place of attachment of a chip to a workpiece, the chip forming the second electrode of said spark gap, said electrode being electrically connected to said pulse generating means and adapted to receive an electric pulse for producing a spark across said gap so that a compression wave is formed applying a shearing force to the chip at its place of attachment to the workpiece whereby the chip is detached from the workpiece.

4. Apparatus according to claim 2, including reflector means for directing the pressure wave produced by said spark gap to the chip.

5. Apparatus according to claim 4, wherein said reflector means comprises a support member formed with a recess, said electrodes being located in said recess.

6. Apparatus for periodically detaching chips from a workpiece during a machining operation, comprising pulse generating means for generating a periodic high current pulse, and a fuse wire located adjacent the place of attachment of a chip to a workpiece, said fuse wire being electrically connected to said pulse generating means for receiving an electric pulse explosively vaporizing said fuse wire so that a compression wave is formed applying a shearing force to the chip at its place of attachment to the workpiece whereby the chip is detached from the workpiece.

7. Apparatus according to claim 6, wherein the fuse wire extends in a bore formed in a supporting member, and including means for reaming said bore after the fuse wire is vaporized for removing the ends of the vaporized fuse wire from said bore, and supply means for automatically feeding fuse wire into said bore for replacing the vaporized fuse wire.

8. Apparatus for periodically detaching chips from a workpiece during a machining operation, comprising pulse generating means for generating a periodic high current pulse, and a coil located adjacent the place of attachment of a chip to a workpiece, said coil being electrically connected to said pulse generating means and being energizable by an electric pulse for producing a magnetic field adapted to induce currents in the chip opposing said magnetic field so that a repulsive shearing force is applied to the chip at its place of attachment to the workpiece whereby the chip is detached from the workpiece.

9. Method of periodically detaching chips from a workpiece during a machining operation, which comprises generating a periodic high current pulse and applying said high current pulse at a location adjacent the place of attachment of a chip to a workpiece for producing a pressure wave exerting a shearing force to the chip at its place of attachment to the workpiece whereby the chip is detached from the workpiece.

10. Method of periodically detaching chips from a workpiece during a machining operation, which comprises generating a periodic high current pulse, applying said high current pulse at a location adjacent the place of attachment of a chip to a workpiece for producing a pressure wave, and guidingly reflecting said pressure wave to the chip at its place of attachment to the workpiece for exerting a shearing force thereto whereby the chip is detached from the workpiece.

11. Method of periodically detaching chips from a workpiece during a machining operation, which comprises generating a periodic high current pulse and forming a high intensity spark therewith at a location adjacent the place of attachment of a chip to a workpiece for producing a pressure wave exerting a shearing force to the chip at its place of attachment to the workpiece whereby the chip is detached from the workpiece.

12. Method of periodically detaching chips from a workpiece during a machining operation, which comprises generating a periodic high current pulse and explosively vaporizing a fuse wire therewith at a location adjacent the place of attachment of a chip to a workpiece for producing a pressure wave exerting a shearing force to the chip at its place of attachment to the workpiece whereby the chip is detached from the workpiece, removing the residue of the vaporized fuse wire and automatically supplying replacement fuse wire for the vaporized fuse wire.

13. Method of periodically detaching chips from a workpiece during a machining operation, which comprises generating a periodic high current pulse and producing therewith a magnetic field adjacent the place of attachment of a chip to a workpiece for inducing currents in the chip in opposition to said magnetic field so that a repulsive shearing force is applied to the chip at its place of attachment to the workpiece whereby the chip is detached from the workpiece.

No references cited.

RICHARD M. WOOD, *Primary Examiner.*

R. F. STAUBLY, *Assistant Examiner.*